United States Patent [19]
Kotzin et al.

[11] Patent Number: 5,787,130
[45] Date of Patent: Jul. 28, 1998

[54] METHOD AND APPARATUS FOR CANCELING INTERFERENCE IN A SPREAD-SPECTRUM COMMUNICATION SYSTEM

[75] Inventors: Michael D. Kotzin, Buffalo Grove, Ill.; Reuven Meidan, Ramat Hasharon, Israel

[73] Assignee: Motorola Inc., Schaumburg, Ill.

[21] Appl. No.: 763,160

[22] Filed: Dec. 10, 1996

[51] Int. Cl.$^6$ .................. H04B 1/10; H03D 1/04
[52] U.S. Cl. .................. 375/346; 375/206; 370/342; 370/441; 455/296
[58] Field of Search .................. 375/200, 206, 375/346, 348; 327/310; 348/607; 455/296; 370/342, 441

[56] References Cited

U.S. PATENT DOCUMENTS

| | | | |
|---|---|---|---|
| 5,235,612 | 8/1993 | Stilwell et al. | 375/200 |
| 5,418,814 | 5/1995 | Hulbert | 375/346 |
| 5,553,062 | 9/1996 | Schilling et al. | 375/346 |
| 5,687,162 | 11/1997 | Yoshida et al. | 375/346 |

*Primary Examiner*—Temesghen Ghebretinsae
*Attorney, Agent, or Firm*—Kenneth A. Haas

[57] ABSTRACT

A technique for decoding and removing a single subscriber's signal from a composite signal in a DS-CDMA system is provided. A particular subscriber's signal is removed from the composite signal by despreading the composite signal (120) to form a multiplicity of despread QPSK signals representative of multiple subscribers. Next, multipath characteristics are determined (303) for each of the multiple subscribers. Utilizing multipath characteristics (204), the multiple subscribers' signals are determined by combining multipath components of each signal (305). Next, data related to a particular subscriber is determined (307) and the subscriber's signal is "reconstructed" to contain multipath characteristics (204) as originally received (309). Finally, the reconstructed signal is output to a summing node (128) where it is combined with the delayed composite signal (120).

11 Claims, 5 Drawing Sheets

METHOD AND APPARATUS FOR CANCELING INTERFERENCE IN A SPREAD-SPECTRUM COMMUNICATION SYSTEM

FIELD OF THE INVENTION

The present invention generally relates to canceling interference in signals in a communication system, and more particularly to a method and apparatus for canceling interference in signals having undergone multipath scattering.

BACKGROUND OF THE INVENTION

In a communication system such as a direct sequence spread-spectrum code division multiple access (DS-CDMA) system, a received signal at a base station comprises a multiplicity of frequency and time overlapping coded signals from individual subscribers. Each of these signals is transmitted simultaneously at the same radio frequency (RF) and is distinguishable only by its specific encoding. In other words, the uplink signal received at a base-station receiver is a composite signal of each transmitted signal and an individual subscriber's signal is distinguishable only after decoding.

In conventional DS-CDMA systems, the receiver decodes each subscriber separately by applying each respective subscribers' code to the composite received signal. Each individual subscriber's signal is thereby "despread" from the composite received signal. Due to the nature of the family of codes utilized, the other subscriber's signals remain in a spreaded form and act only to degrade the recovered signal as uncorrelated interference. This allows the decoding of subscriber data bits for a particular subscriber.

Prior art techniques of interference cancellation are known to reduce even the uncorrelated interference. This permits an increase in the sensitivity and or capacity of the multi-subscriber system. The most common technique is to synthesize a replica of a particular subscriber's received signal, after it has been properly decoded, and utilize the synthesized replica to cancel interference (by subtraction) in the received signal. Such a prior-art method of interference cancellation is described in U.S. Patent "Method and Apparatus for Canceling Spread-Spectrum Noise" by Stilwell, et. al., (U.S. Pat. No. 5,235,612) assigned to the assignee of the present invention, and incorporated herein by reference. By utilizing such prior-art techniques it is possible to effectively eliminate a subscriber's signal from the composite received signal such that the decoding of subsequent subscriber's signals is accomplished with greater accuracy.

In a land mobile environment, received signals from subscribers undergo multipath scattering. In other words, a signal transmitted by a subscriber undergoes multiple reflections before it is received at a receiver, and these reflections cause "echoes" of the transmitted signal to be simultaneously received by the receiver. These echoes are generally of different amplitudes and different time delays, and therefore cause a signal received from each subscriber to actually consists of a multiplicity of signals (the actual signal and its echoes), each having a different amplitude and time delay. Such multi-path scattering causes significant contribution to the interference at the receiver.

Because of multipath scattering, prior-art interference cancellation techniques are deficient in the synthesis of the replica of a particular subscriber's received signal since the synthesis of the replica does not take into consideration the multipath nature (i.e., the echoes) of the received signal. Therefore, a need exists for improved interference cancellation which accounts for multipath scattering of the received signals.

DETAILED DESCRIPTION OF A PREFERRED EMBODIMENT

Figure 1:
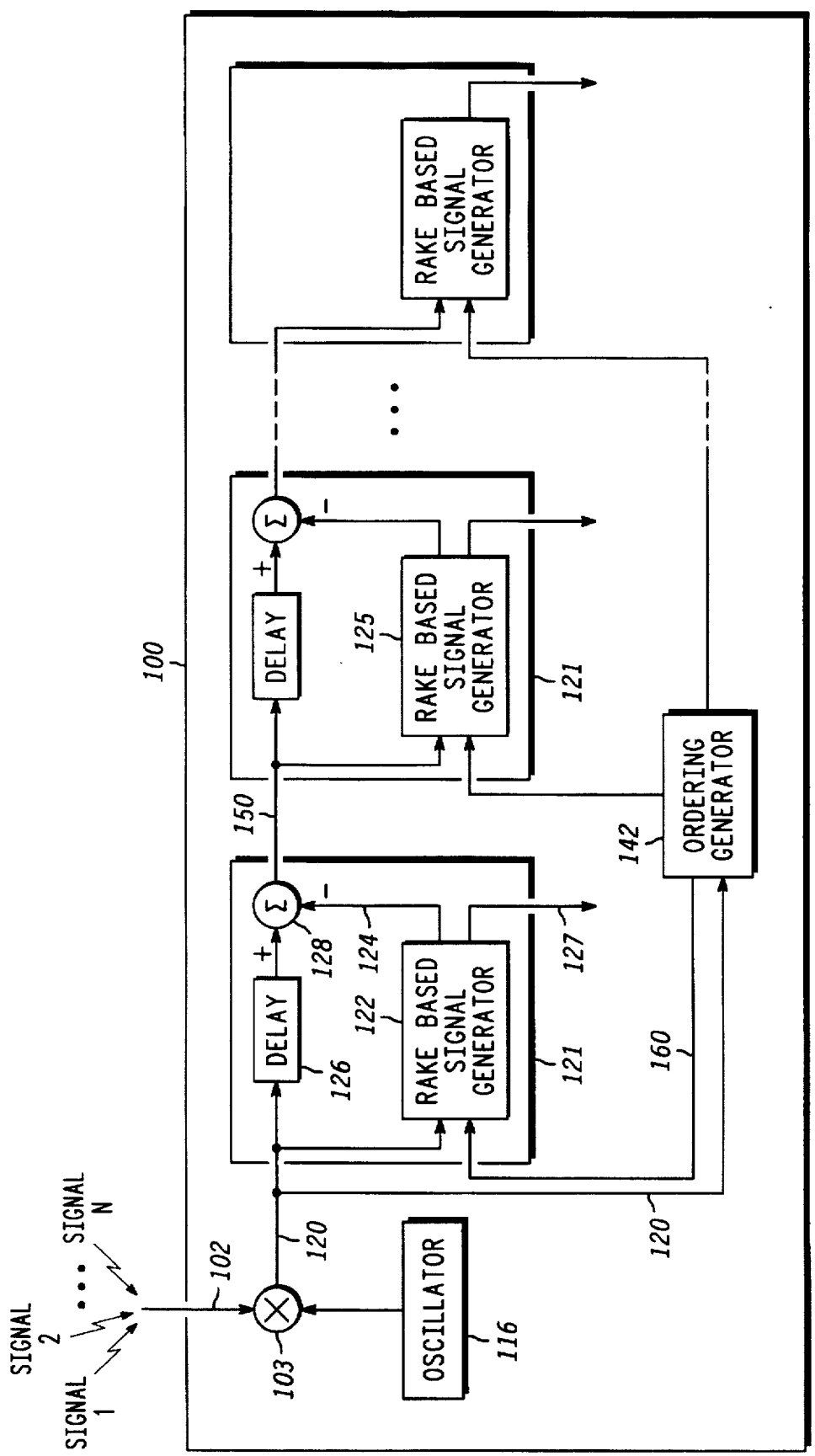
FIG. 1 generally depicts, in block diagram form, a receiver unit which may beneficially implement interference cancellation in accordance with the invention.

Stated generally, a technique for decoding and removing a single subscriber's signal from a composite signal in a DS-CDMA system is provided. A particular subscriber's signal is removed from the composite signal by despreading the composite signal to form a multiplicity of despread QPSK signals representative of multiple subscribers. Next, multipath characteristics are determined for each of the multiple subscribers. Utilizing multipath characteristics, the multiple subscribers' signals are determined by combining multipath components of each signal. Next, data related to a particular subscriber is determined and the subscriber's signal is "reconstructed" to contain multipath characteristics as originally received. Finally, the reconstructed signal is output to a summing node where it is combined with the delayed composite signal.

The present invention encompasses a method of canceling interference in a spread-spectrum communication system. The method comprises the steps of receiving a first spread-spectrum signal having a plurality of subscribers modulated thereon and identifying multipath characteristics for the plurality of subscribers. Next, multipath characteristics are utilized to construct a second spread-spectrum signal representative of the first spread-spectrum signal free from signals caused by multipath scattering. Information is then extracted from the second spread-spectrum signal representative of an individual subscriber to produce extracted information, and this information is utilized to produce a reconstructed signal representative of the individual subscriber, where the reconstructed signal representative of the individual subscriber includes multipath scattering components. Finally, the reconstructed signal is inverse summed with the first spread-spectrum signal to produce a third spread-spectrum signal substantially free of any interference contributed by the individual subscriber.

An alternate embodiment of the present invention encompasses a method of canceling interference in a spread-spectrum communication system. The method comprises the steps of receiving a composite signal having a multiplicity of frequency and time overlapping coded (spread) signals each of which has undergone multipath scattering and despreading the composite signal to form a multiplicity of despread signals representative of a plurality subscriber transmitted signals. Next, multipath characteristics are identified for the plurality subscriber transmitted signals and these characteristics are to combine multipath components of the plurality of subscriber transmitted signals to produce a plurality of corrected subscriber transmitted signals. Information related to a first signal is extracted from the corrected subscriber transmitted signals and the first signal is reconstructed, as originally received, where the reconstructed first signal contains multipath scattering components of the first signal as originally transmitted. Finally the reconstructed signal is inverse summed to produce a third spread-spectrum signal substantially free of any interference contributed by the first signal.

A final embodiment of the present invention encompasses an apparatus for canceling interference in a spread-spectrum communication system comprising a despreader having as an input a composite signal and outputting a plurality of despread signals, a multipath identifier having as an input the plurality of despread signals, and outputting multipath characteristics of the plurality of despread signals, a RAKE finger combiner having as an input the plurality of despread signals and the multipath characteristics of the plurality of despread signals, and outputting a first signal which is a representative of the composite signal without multipath scattering components, a data decoder having as an input, the first signal and outputting information related to an individual signal, a signal reconstructor having as inputs, information related to the individual signal and the multipath components, and outputting the individual signal as originally received, wherein the individual signal as originally received contains multipath scattering components, and an inverse summer having as inputs the individual signal as originally received and the composite signal and outputting the composite signal substantially free of any interference contributed by the individual signal.

FIG. 1 generally depicts, in block diagram form, receiver 100 which may beneficially implement interference cancellation in accordance with the invention. In a preferred embodiment of the present invention receiver 100 is contained within a cellular base station (not shown) such as a Motorola SC9600 CDMA base station. Receiver 100 comprises downconverter 103, oscillator 116, ordering generator 142, and a plurality of signal canceling units 121. In the preferred embodiment of the present invention, signal canceling units 121 comprise delay circuit 126, rake based signal generator 122, and summer 123. Operation of receiver 100 in accordance with a preferred embodiment of the present invention occurs as follows: Uplink communication signals from multiple remote units (subscribers) are received at downconverter 103. Receiver 100 determines or knows from previously-stored information in receiver 100 the carrier phase, PN spreading code, and data for each remote unit. In other words, receiver 100 contains knowledge of each of the received signals ($SIGNAL_1$, $SIGNAL_2$, ..., $SIGNAL_N$) and thus cancellation of each of the received signals from a particular received composite signal can be achieved.

Continuing, in order to simplify hardware of the receiver 100, the composite received signal is down converted to composite signal 120 at a frequency of about 10 MHz by oscillator 116. Spread-spectrum composite signal 120 is then input into canceling unit 121. As previously stated, spread-spectrum composite signal 120 has undergone multipath scattering, and as a result, spread-spectrum composite signal 120 comprises multiple echoes for each subscriber. Canceling unit 121 splits composite signal 120 and inputs composite signal 120 into delay circuit 126 and RAKE-based signal generator 122. Output from the RAKE-based signal generator 122 is cancellation signal 124 and digital data 127, the generation of which is described below. Cancellation signal 124 is then subtracted, via an inverse summing node 128, with spread-spectrum composite signal 120 so that any interference contributed by a chosen subscriber signal (e.g., $SIGNAL_1$) is substantially eliminated. Resulting signal 130 represents spread-spectrum composite signal 120 "clean" of any interference contributed by the chosen subscriber signal. In the preferred embodiment of the present invention, output signal 130 is then input into a second canceling unit 121 to undergo substantially the same signal cancellation procedure, except that subsequent processing by canceling units 121 will remove interference contributed by other transmitted subscriber signals (e.g., $SIGNAL_2$ through $SIGNAL_{N-1}$). Unlike prior-art methods of signal cancellation, in the preferred embodiment of the present invention signal generator 122 utilizes multipath scattering components of $SIGNAL_N$ in the production of canceling signal 124. By taking multipath scattering into consideration when synthesizing a replica of a particular subscriber's received signal, and utilizing the synthesized replica to cancel interference of a particular subscriber, the particular subscriber's interference can be better removed from received composite signal 120 than with prior-art techniques. Thus, the decoding of other subscriber's signals with greater accuracy is thereby made possible using the "subsequent" composite received signal (i.e., after interference cancellation) without the contribution of the first subscriber.

Figure 2:
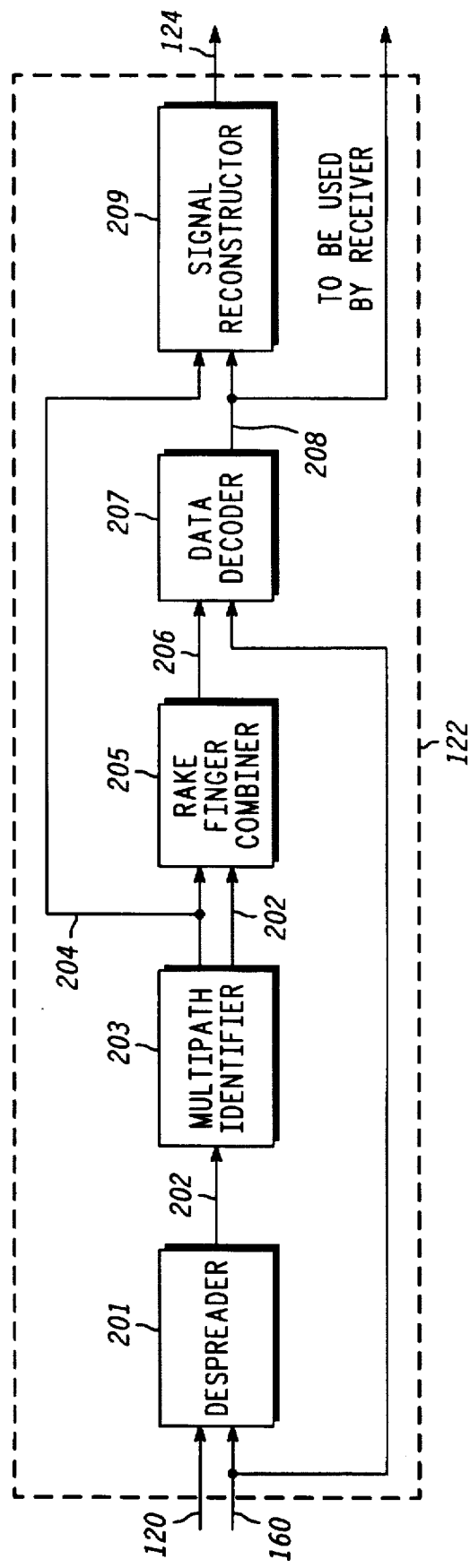
FIG. 2 generally depicts, in block diagram form, a RAKE based signal generator of FIG. 1 in accordance with the invention.

FIG. 2 generally depicts, in block diagram form, RAKE based signal generator 122 of FIG. 1 in accordance with the preferred embodiment of the present invention. RAKE based signal generator 122 comprises despreader 201, multipath identifier 203, rake finger combiner 205, data decoder 207, and signal reconstructor 209. Operation of RAKE based signal generator 122 occurs as follows: Composite signal 120 enters despreader 201. As mentioned above, composite signal 120 comprises a multiplicity of frequency and time overlapping coded (spread) signals each of which has undergone multipath scattering. Despreader 201 despreads composite signal 120 to form signal 202 comprising a multiplicity of despread QPSK signals representative of $SIGNAL_1$ through $SIGNAL_N$. In the preferred embodiment of the present invention signal 202 is formed by despreading composite signal 120 with the appropriate despreading code (PN Code) to strip the spreading code from composite signal 120. The appropriate despreading code is supplied to despreader by ordering generator 142 through input signal 160.

Signal 202 is then input into multipath identifier 203. Multipath identifier 203 determines multipath characteristics for $SIGNAL_1$ through $SIGNAL_N$, which arise from the correlation peaks of the various echoes. These multipath characteristics include, but are not limited to, time delays and respective amplitudes and phases between correlation peaks for each signal. For a general background on identification of multipath components in communication systems, reference is made to "Introduction to Spread-Spectrum Antimultipath Techniques and Their Application to Urban Digital Radio" by Turin, published in the Proceedings of the IEEE, Vol. 68, No. 3, March 1980. Multipath characteristics 204 are output from multipath identifier 203 (along with signal 202) and enter RAKE finger combiner 205. RAKE finger combiner 205 utilizes multipath characteristics 204 to combine multipath components of $SIGNAL_1$ through $SIGNAL_N$ resulting in signal 206 which is a representation of signal 202 with "echoes" caused by multipath scattering. Signal 206 is output to data decoder 207 which extracts information related to a particular signal (e.g. SIGNAL$_1$) from signal 206 and outputs this information as resulting signal 208. In other words, data decoder 207 receives signal 206, extracts information related to only one signal (in this case SIGNAL$_1$) and outputs this information as resulting signal 208. In the preferred embodiment of the present invention ordering generator 142 supplies data decoder 207 with information regarding which signal to extract from signal 206. (Determination of which signal to extract from signal 206 will be discussed below).

Continuing, signal reconstructor 209 receives signal 208, along with multipath characteristics 204 (supplied by multipath identifier 203) and "reconstructs" SIGNAL$_1$ as originally received. (i.e., with echoes). In other words, signal reconstructor 209 recreates the "echoes" that originally existed in SIGNAL$_1$ and outputs the reconstructed signal as cancellation signal 124. Since cancellation signal 124 contains the multipath scattering components of the transmitted signal (SIGNAL$_1$), prior-art interference cancellation techniques can be improved since a better replica of the transmitted signal will be removed from composite signal 120.

In the preferred embodiment of the present invention the accuracy of cancellation signal 124 is improved by utilizing cancellation signals representative of the most reliable transmitted signals (SIGNAL$_1$, SIGNAL$_2$, . . . , SIGNAL$_N$) prior to using cancellation signals from less reliable signals. In other words, RAKE based signal generator 122 (existing within the first canceling unit 121 of FIG. 1) will utilize the most reliable signal, while RAKE based signal generator 125 (existing within the second canceling unit 121 of FIG. 1) will utilize the second most reliable signal. (Note that to the second canceler the input signal is clean from subscriber SIGNAL$_1$). In order to determine the order of cancellation, composite signal 120 is input into ordering generator 142. Ordering generator 142 despreads composite signal 120 and rank orders each signal (SIGNAL$_1$, SIGNAL$_2$, . . . , SIGNAL$_N$) by received signal strength. In the preferred embodiment of the present invention, ordering generator 142 rank orders each signal by bit energy per noise density (i.e., $E_b/N_0$, which is defined as the ratio of energy per information-bit to noise-spectral density) associated with each received signal. Ordering generator 142 outputs the appropriate signal to decode to each RAKE based signal generator within receiver 100.

Figure 3:
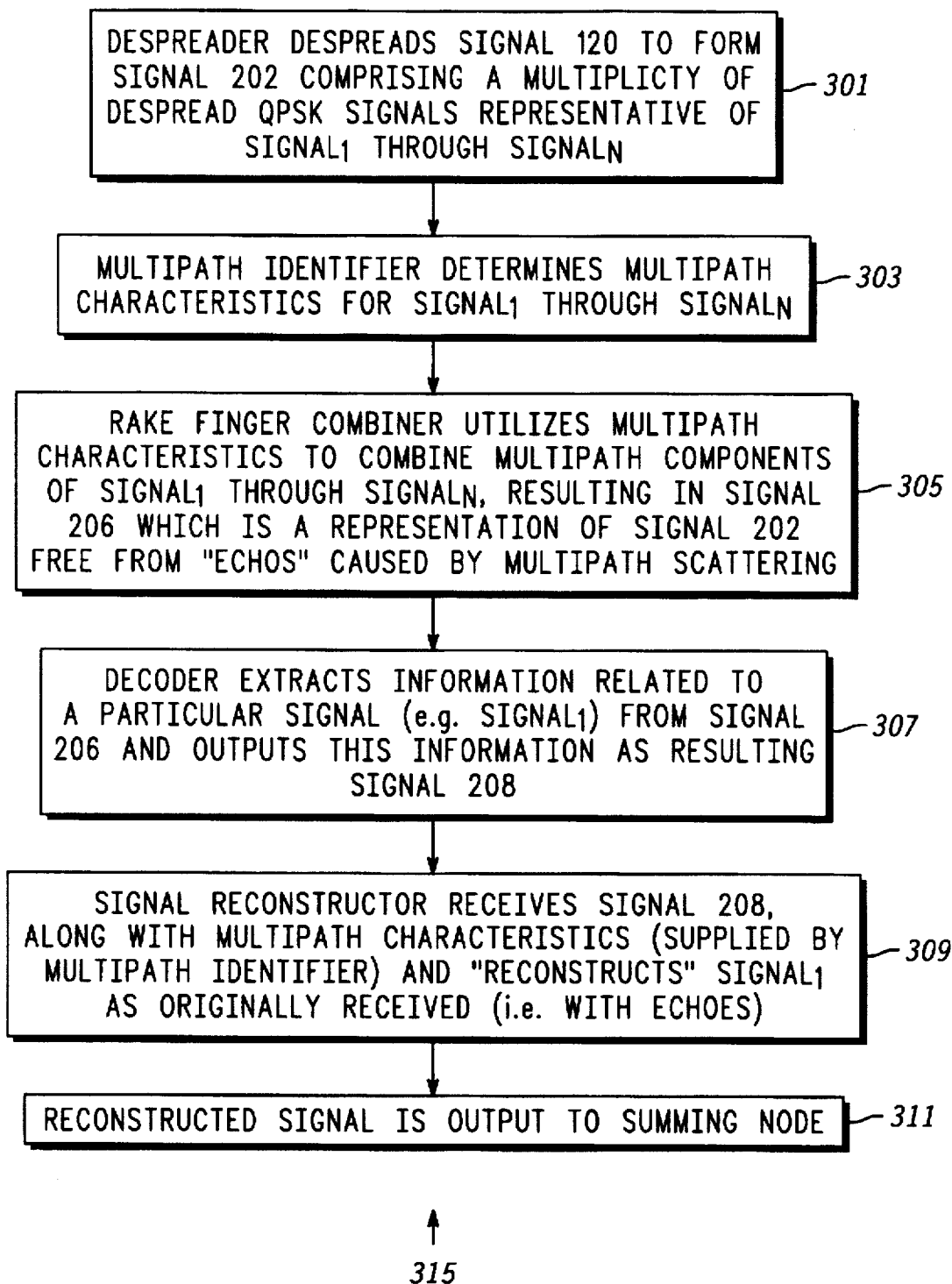
FIG. 3 is a flow chart illustrating operation of a signal cancellation unit of FIG. 1 in accordance with the preferred embodiment of the present invention.

FIG. 3 is a flow chart illustrating operation of a signal cancellation unit of FIG. 1. The logic flow begins at step 301 where despreader 201 despreads composite signal 120 to form signal 202 comprising a multiplicity of despread QPSK signals representative of SIGNAL$_1$ through SIGNAL$_N$. Next, at step 303 multipath identifier 203 determines multipath characteristics for SIGNAL$_1$ through SIGNAL$_N$. At step 305, RAKE finger combiner 205 utilizes multipath characteristics 204 to combine multipath components of SIGNAL$_1$ through SIGNAL$_N$, resulting in signal 206 which is a representation of signal 202 free from "echoes" caused by multipath scattering. At step 307 decoder 207 extracts information related to a particular signal (e.g. SIGNAL$_1$) from signal 206 and outputs this information as resulting signal 208. Signal reconstructor 209 receives signal 208, along with multipath characteristics 204 (supplied by multipath identifier 203) and "reconstructs" SIGNAL$_1$ as originally received. (step 309). Finally, at step 311, the reconstructed signal is output to summing node 128 where it is combined with delayed composite signal 120.

Figure 4:
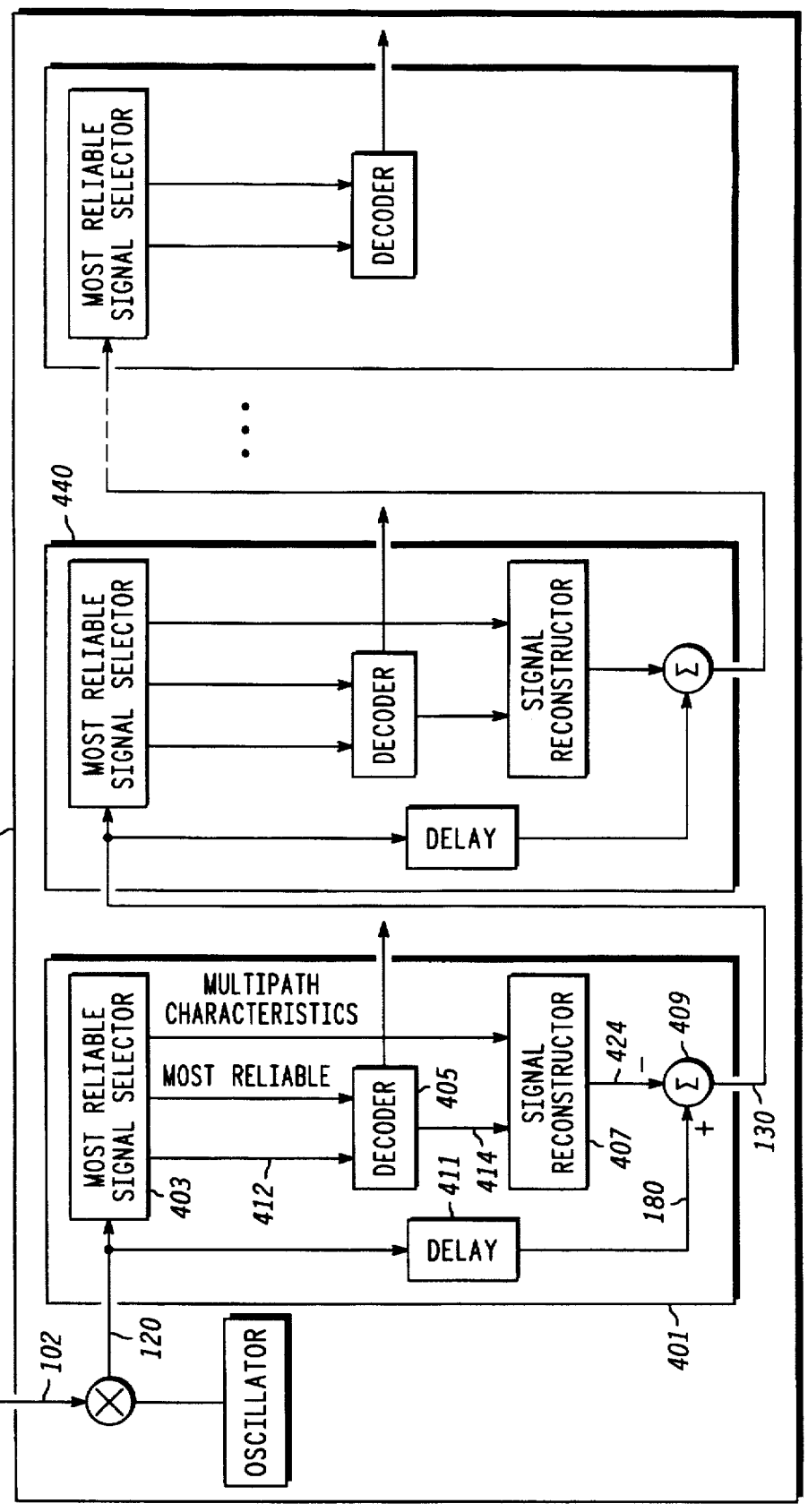
FIG. 4 generally depicts, in block diagram form, a receiver unit which may beneficially implement interference cancellation in accordance with an alternate embodiment of the present invention.

FIG. 4, generally depicts, in block diagram form, canceling unit 401 which may beneficially implement interference cancellation in accordance with an alternate embodiment of the present invention. Unlike the preferred embodiment, in the alternate embodiment of the present invention canceling units within receiver 400 comprise a most reliable signal selector 403 which determines the most reliable signal to decode and subtract from composite signal 120. Canceling unit 401 comprises most reliable signal selector 403, decoder 405, signal reconstructor 407, and summing circuit 409. Operation of canceling unit 401 occurs as follows: Uplink communication signals from multiple remote units are received at downconverter 103 and are downconverted to form composite signal 120. Canceling unit 401 determines or knows from previously-stored information in receiver 100, the carrier phase, PN spreading code, and data for each remote unit. In other words, canceling unit 401 contains knowledge of each of the received signals (SIGNAL$_1$, SIGNAL$_2$, . . . , SIGNAL$_N$) and thus cancellation of each of the received signals from a particular received signal can be achieved.

Spread-spectrum composite signal 120 is then input into canceling unit 401 where it enters most reliable signal selector 403. Most reliable signal selector 403 despreads composite signal 120, identifies multipath components of composite signal 120, combines multipath components of composite signal 120, and determines a most reliable signal (e.g., SIGNAL$_1$) of composite signal 120. Most reliable signal selector has three outputs: 1) multipath characteristics regarding composite signal 120, 2) signal 412 which is a representation of signal 120 free from "echoes" caused by multipath scattering, and 3) identification of the most reliable signal.

Signal 412 and Information on the most reliable signal are input into decoder 405. Decoder 405 utilizes the identification of the most reliable signal, extracts the most reliable signal (in this case SIGNAL$_1$ from signal 412 forming signal 414. Signal 414 is output to signal reconstructor 407. Reconstructor 407 receives signal 414, along with multipath characteristics (supplied by most reliable signal selector 403) and "reconstructs" SIGNAL$_1$ as originally received. (i.e., with echoes). In other words, signal reconstructor 407 recreates the "echoes" that originally existed in SIGNAL$_1$ and outputs the reconstructed signal as cancellation signal 424. Cancellation signal 424 is then subtracted, via a inverse summing node 409, with spread-spectrum composite signal 120 so that any interference contributed by a chosen signal (e.g., SIGNAL$_1$ ) is substantially eliminated. Resulting signal 130 represents spread-spectrum composite signal 120 "clean" of any interference contributed by the chosen signal. In the preferred embodiment of the present invention, output signal 130 is then input into a second canceling unit 440 to undergo substantially the same signal cancellation procedure, except that subsequent processing by canceling units will remove interference contributed by other transmitted signals (e.g., SIGNAL$_2$ through SIGNAL$_{N-1}$). Because cancellation signal 424 contains the multipath scattering components of the transmitted signal (SIGNAL$_1$, the particular subscriber's interference can be better removed from received composite signal 120 than with prior-art techniques. Thus, the decoding of other subscriber's signals with greater accuracy is thereby made possible using the "subsequent" composite received signal (i.e., after interference cancellation) without the contribution of the first subscriber (i.e., SIGNAL$_1$).

Figure 5:
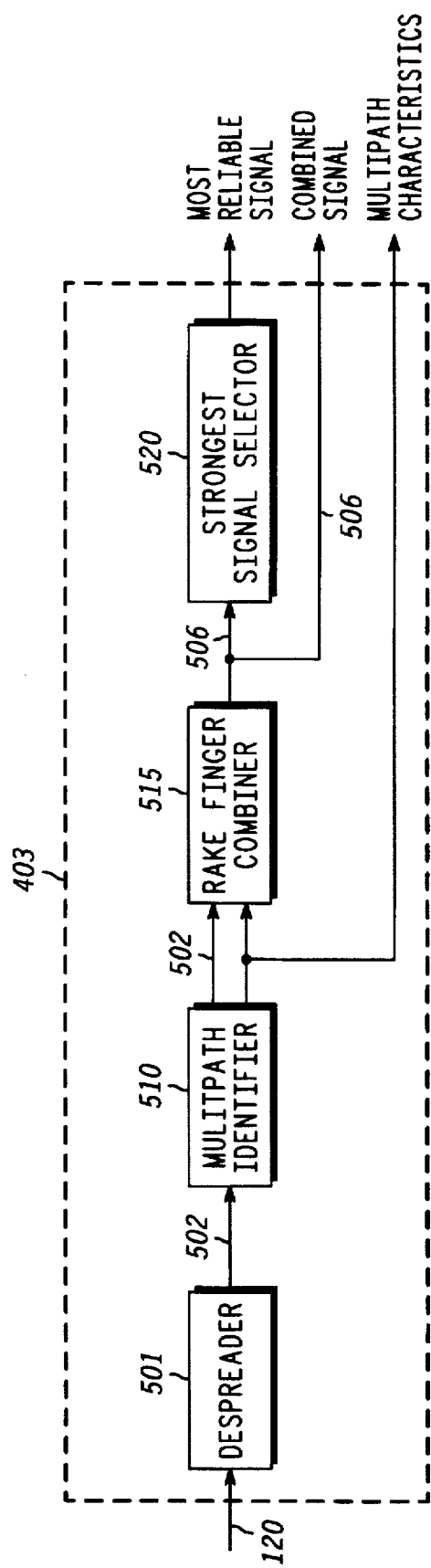
FIG. 5 generally depicts, in block diagram form, a most reliable signal selector of FIG. 4 in accordance with an alternate embodiment of the present invention.

FIG. 5 generally depicts, in block diagram form, most reliable signal selector 403 of FIG. 4 in accordance with the alternate embodiment of the present invention. Signal selector 403 comprises despreader 501, multipath identifier 510, RAKE finger combiner 515, and strongest signal selector 520. Operation of selector 403 in accordance with the alternate embodiment of the present invention occurs as follows: Composite signal 120 enters despreader 501. As mentioned above, composite signal 120 comprises a multiplicity of frequency and time overlapping coded (spread) signals each of which has undergone multipath scattering. Despreader 501 despreads composite signal 120 to form signal 502 comprising a multiplicity of despread QPSK signals representative of $SIGNAL_1$ through $SIGNAL_N$. In the preferred embodiment of the present invention signal 502 is formed by despreading composite signal 120 with the appropriate despreading code (PN Code) to strip the spreading code from composite signal 120.

Signal 502 is then input into multipath identifier 510. Multipath identifier 510 determines multipath characteristics for $SIGNAL_1$ through $SIGNAL_N$, which arise from the correlation peaks of the various echoes. These multipath characteristics include, but are not limited to, time delays and respective amplitudes and phases between correlation peaks for each signal. Multipath characteristics are output from multipath identifier 510 (along with signal 502) and enter RAKE finger combiner 515. RAKE finger combiner 515 utilizes multipath characteristics output from multipath identifier 510 to combine multipath components of $SIGNAL_1$ through $SIGNAL_N$, resulting in signal 506 which is a representation of signal 502 free from "echoes" caused by multipath scattering. Signal 506 is input into strongest signal selector 520, where the strongest signal (e.g., $SIGNAL_1$) is determined by rank ordering each signal by the $E_b/N_o$ associated with each received signal. Selector 520 outputs the appropriate signal to decode, (utilized by decoder 405).

While the invention has been particularly shown and described with reference to a particular embodiment, it will be understood by those skilled in the art that various changes in form and details may be made therein without departing from the spirit and scope of the invention. For example, in certain CDMA systems, such as IS-95, it is known that a pilot signal is transmitted with all other user signals. This pilot signal experiences the same multipath as each of the user signals transmitted by that base station for a particular user. Therefore, RAKE analysis of the pilot, and determination of the multipath parameters of the pilot obtained by the multipath identification of the pilot signal, may be beneficially used for multipath signal generation for each of the user's signals after data decoding is accomplished at each stage. It is the intent of the inventors that various modifications come within the scope of the following claims.

What we claim is:

1. A method of canceling interference in a spread-spectrum communication system, the method comprising the steps of:

receiving a first spread-spectrum signal having a plurality of subscribers modulated thereon;

identifying multipath characteristics for the plurality of subscribers;

utilizing the multipath characteristics to construct a second spread-spectrum signal representative of the first spread-spectrum signal free from signals caused by multipath scattering;

extracting information from the second spread-spectrum signal representative of an individual subscriber to produce extracted information;

utilizing the extracted information and the multipath characteristics to produce a reconstructed signal representative of the individual subscriber, wherein the reconstructed signal representative of the individual subscriber includes multipath scattering components; and inverse summing the reconstructed signal representative of the individual subscriber with the first spread-spectrum signal to produce a third spread-spectrum signal substantially free of any interference contributed by the individual subscriber.

2. The method of claim 1 wherein the step of extracting information from the second spread-spectrum signal representative of the individual subscriber comprises the steps of:

determining from the first spread-spectrum signal having a plurality of subscribers modulated thereon, a subscriber having a most reliable signal; and extracting information from the second spread-spectrum signal representative of the subscriber having the most reliable signal to produce extracted information.

3. The method of claim 2 wherein the step of extracting information from the second spread-spectrum signal representative of the subscriber having the most reliable signal comprises extracting information from the second spread-spectrum signal representative of the subscriber having a highest ratio of energy per information-bit to noise-spectral density ($E_b/N_o$).

4. The method of claim 1 wherein the step of receiving the first spread-spectrum signal comprises the step of receiving the first spread-spectrum signal having a multiplicity of frequency and time overlapping coded (spread) signals each of which has undergone multipath scattering.

5. The method of claim 1 wherein the step of identifying multipath characteristics comprises the step of identifying characteristics from a group consisting of time delays, respective amplitudes, and phases between correlation peaks.

6. A method of canceling interference in a spread-spectrum communication system, the method comprising the steps of:

receiving a composite signal having a multiplicity of frequency and time overlapping coded (spread) signals each of which has undergone multipath scattering;

despreading the composite signal to form a multiplicity of despread signals representative of a plurality of subscriber transmitted signals;

identifying multipath characteristics for the plurality of subscriber transmitted signals;

utilizing the multipath characteristics to combine multipath components of the plurality of subscriber transmitted signals to produce a plurality of corrected subscriber transmitted signals;

extracting information related to a first signal from the corrected subscriber transmitted signals;

reconstructing, as originally received, the first signal, wherein the reconstructed first signal contains multipath scattering components of the first signal as originally transmitted; and inverse summing the reconstructed first signal with composite signal to produce a third spread-spectrum signal substantially free of any interference contributed by the first signal.

7. The method of claim 6 wherein the step of extracting information related to the first signal comprises the steps of:

determining from the multiplicity of despread signals representative of the plurality subscriber transmitted signals, a subscriber having a most reliable signal; and extracting information related to a first signal from the corrected subscriber transmitted signals representative of the subscriber having the most reliable signal.

8. The method of claim 6 wherein the step of identifying multipath characteristics comprises the step of identifying characteristics from a group consisting of time delays, respective amplitudes, and phases between correlation peaks.

9. An apparatus for canceling interference in a spread-spectrum communication system, the apparatus comprising:

a despreader having as an input a composite signal and outputting a plurality of despread signals;

a multipath identifier having as an input the plurality of despread signals, and outputting multipath characteristics of the plurality of despread signals;

a RAKE finger combiner having as an input the plurality of despread signals and the multipath characteristics of the plurality of despread signals, and outputting a first signal which is a representative of the composite signal without multipath scattering components;

a data decoder having as an input, the first signal and outputting information related to an individual signal;

a signal reconstructor having as inputs, information related to the individual signal and the multipath components, and outputting the individual signal as originally received, wherein the individual signal as originally received contains multipath scattering components; and an inverse summer having as inputs the individual signal as originally received and the composite signal and outputting the composite signal substantially free of any interference contributed by the individual signal.

10. The apparatus of claim 9 further comprising an ordering generator having as an input the composite signal, and outputting a most reliable signal.

11. The apparatus of claim 10 wherein the most reliable signal comprises a signal with the highest ratio of energy per information-bit to noise-spectral density ($E_b/N_o$).

* * * * *